US011503168B2

(12) United States Patent
Okamura et al.

(10) Patent No.: US 11,503,168 B2
(45) Date of Patent: Nov. 15, 2022

(54) INFORMATION PROCESSING APPARATUS ENABLING COMMUNICATION SETTINGS TO BE MADE WITH EASE, METHOD OF CONTROLLING INFORMATION PROCESSING APPARATUS, AND STORAGE MEDIUM

(71) Applicant: CANON KABUSHIKI KAISHA, Tokyo (JP)

(72) Inventors: Shintaro Okamura, Tokyo (JP); Motoki Koshigaya, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/029,223

(22) Filed: Sep. 23, 2020

(65) Prior Publication Data
US 2021/0006669 A1    Jan. 7, 2021

Related U.S. Application Data

(63) Continuation of application No. 15/044,385, filed on Feb. 15, 2016, now abandoned.

(30) Foreign Application Priority Data
Feb. 18, 2015 (JP) ................................ 2015-029501

(51) Int. Cl.
G06F 3/12 (2006.01)
H04N 1/00 (2006.01)
(Continued)

(52) U.S. Cl.
CPC ....... *H04N 1/00307* (2013.01); *G06F 3/1204* (2013.01); *G06F 3/1236* (2013.01);
(Continued)

(58) Field of Classification Search
CPC ....... H04N 1/00307; H04N 2201/0094; H04N 2201/006; H04N 2201/0055; H04W 4/80;
(Continued)

(56) References Cited

U.S. PATENT DOCUMENTS 5,768,516 A   6/1998 Sugishima
7,027,169 B1  4/2006 Morikawa
(Continued)

FOREIGN PATENT DOCUMENTS

JP   2004364145 A   12/2004
JP   2005210328 A    8/2005
(Continued)

OTHER PUBLICATIONS

Office Action issued in Japanese Appln. No. 2015-029501 dated Mar. 5, 2019.
(Continued)

*Primary Examiner* — Huo Long Chen
(74) *Attorney, Agent, or Firm* — Rossi, Kimms & McDowell LLP

(57) ABSTRACT

An information processing apparatus which makes it possible to make communication settings with ease. A mobile terminal as the information processing apparatus includes a Bluetooth controller that causes a Bluetooth communication section to receive a packet, a CPU that generates a device list, based on the packet, a display section that displays the device list. The CPU selects a device from the device list based on a received radio field intensity of the packet or selects a device from the device list based on a selection operation by a user. The mobile terminal further includes a wireless LAN controller that cause a wireless LAN communication section to transmit data to the selected device.

15 Claims, 12 Drawing Sheets

(51) Int. Cl.
*H04W 8/00* (2009.01)
*H04W 4/80* (2018.01)
*H04W 84/12* (2009.01)
*H04W 76/14* (2018.01)

(52) U.S. Cl.
CPC ............ *G06F 3/1292* (2013.01); *H04W 4/80* (2018.02); *H04W 8/005* (2013.01); *H04N 2201/006* (2013.01); *H04N 2201/0055* (2013.01); *H04N 2201/0094* (2013.01); *H04W 76/14* (2018.02); *H04W 84/12* (2013.01)

(58) Field of Classification Search
CPC ..... H04W 8/005; H04W 76/14; H04W 84/12; G06F 3/1204; G06F 3/1236; G06F 3/1292
See application file for complete search history.

(56) References Cited

U.S. PATENT DOCUMENTS

| | | |
|---|---|---|
| 8,813,198 B2 | 8/2014 | Louboutin |
| 8,958,100 B2 | 2/2015 | Nishikawa |
| 8,996,731 B2 | 3/2015 | Takayama |
| 9,015,487 B2 | 4/2015 | Xiao |
| 9,201,617 B2 | 12/2015 | Jintsugawa |
| 2005/0128968 A1 | 6/2005 | Yang |
| 2006/0105713 A1* | 5/2006 | Zheng ................... H04L 41/12 455/41.2 |
| 2007/0030516 A1 | 2/2007 | Tsuji |
| 2007/0086052 A1 | 4/2007 | Furuya |
| 2011/0058203 A1 | 3/2011 | Hwang et al. |
| 2011/0141517 A1 | 6/2011 | Tokoyama |
| 2013/0095753 A1* | 4/2013 | Chen ..................... H04L 67/104 455/41.1 |
| 2013/0260683 A1* | 10/2013 | Suzuki .................. H04W 76/11 455/41.1 |
| 2013/0321864 A1 | 12/2013 | Jintsugawa |
| 2014/0002857 A1 | 1/2014 | Huang |
| 2014/0092429 A1 | 4/2014 | Srinivasmurthy |
| 2014/0118778 A1* | 5/2014 | Lee .................... G06K 15/4045 358/1.15 |
| 2014/0153017 A1 | 6/2014 | Watanabe |
| 2014/0157135 A1 | 6/2014 | Lee |
| 2014/0187325 A1 | 7/2014 | Masuda |
| 2014/0295765 A1 | 10/2014 | Wei |
| 2014/0355048 A1 | 12/2014 | Kang |
| 2015/0077798 A1* | 3/2015 | Ren ....................... G06F 3/1204 358/1.15 |
| 2015/0373769 A1* | 12/2015 | Wang .................... H04W 76/20 455/419 |
| 2016/0029148 A1 | 1/2016 | Jackson |
| 2016/0065751 A1 | 3/2016 | Park |
| 2016/0070509 A1* | 3/2016 | Takahira ............... G06F 3/1292 358/1.15 |
| 2016/0073348 A1* | 3/2016 | Tsuzuki ................ H04W 24/04 358/1.13 |
| 2016/0150105 A1 | 5/2016 | Shinomiya |
| 2016/0182624 A1 | 6/2016 | Liang |
| 2016/0360477 A1* | 12/2016 | Saeki ....................... B41J 29/38 |
| 2017/0245314 A1* | 8/2017 | Ohhira .................. H04B 11/00 |
| 2017/0264758 A1 | 9/2017 | Naito |

FOREIGN PATENT DOCUMENTS

| | | |
|---|---|---|
| JP | 2007049271 A | 2/2007 |
| JP | 2013247606 A | 12/2013 |
| JP | 2014050015 A | 3/2014 |
| JP | 2014068351 A | 4/2014 |
| JP | 2014107859 A | 6/2014 |
| JP | 2014110635 A | 6/2014 |
| JP | 2014120804 A | 6/2014 |
| JP | 2014143663 A | 8/2014 |
| JP | 2014179884 A | 9/2014 |
| JP | 2014527327 A | 10/2014 |
| JP | 2015500608 A | 1/2015 |
| JP | 2015200989 A | 11/2015 |
| KR | 1020160025283 A | 3/2016 |
| WO | 2014135711 A1 | 9/2014 |

OTHER PUBLICATIONS

Office Action issued in U.S. Appl. No. 15/044,385 dated May 5, 2017.
Office Action issued in U.S. Appl. No. 15/044,385 dated Oct. 19, 2017.
Office Action issued in U.S. Appl. No. 15/044,385 dated Apr. 4, 2018.
Office Action issued in U.S. Appl. No. 15/044,385 dated Sep. 20, 2018.
Office Action issued in U.S. Appl. No. 15/044,385 dated Mar. 21, 2019.
Office Action issued in U.S. Appl. No. 15/044,385 dated Aug. 7, 2019.
Office Action issued in U.S. Appl. No. 15/044,385 dated Dec. 27, 2019.
Office Action issued in U.S. Appl. No. 15/044,385 dated May 1, 2020.
Office Action issued in Japanese Appln. No. 2019-166464 dated Oct. 6, 2020.
Office Action issued in U.S. Appl. No. 17/363,428 dated Mar. 29, 2022.
Office Action issued in U.S. Appl. No. 17/363,428 dated Aug. 4, 2022.

\* cited by examiner

INFORMATION PROCESSING APPARATUS ENABLING COMMUNICATION SETTINGS TO BE MADE WITH EASE, METHOD OF CONTROLLING INFORMATION PROCESSING APPARATUS, AND STORAGE MEDIUM

BACKGROUND OF THE INVENTION

Field of the Invention

The present invention relates to an information processing apparatus, a method of controlling the information processing apparatus, and a storage medium, and more particularly to an information processing apparatus that enables communication settings to be made with ease by wireless communication, a method of controlling the information processing apparatus, and a storage medium.

Description of the Related Art

When performing various data communication between a data communication apparatus, such as an MFP, and a mobile terminal, such as a smartphone or a tablet PC, wireless communication based on various communication standards is performed according to communication settings of the MFP and the mobile terminal. In data communication, in a case where communication of large-volume data is performed, communication, such as Wi-Fi communication using the standard of Wi-Fi, is performed. On the other hand, in a case where apparatuses are relatively close to each other, and communication of small-volume data is performed, short-distance wireless communication, such as NFC (Near Field Communication), is performed. As short-distance wireless communication, wireless communication using Bluetooth has come into widespread use, and more particularly, BLE (Bluetooth Low Energy) communication which makes it possible to perform power-saving data communication is widely used. Before data communication is performed, wireless communication suitable for its use is selected, and the communication settings are switched according to the selected wireless communication (see e.g. Japanese Patent Laid-Open Publication No. 2004-364145).

For example, before transmitting a print job for performing print processing from a mobile terminal to an MFP, communication settings are changed by using NFC. In NFC, only by moving the devices each having an NFC function closer to each other, it is possible to make communication settings for the devices with ease. For example, only by a user causing a mobile terminal to touch an NFC module provided in an MFP, settings of communication, such as Wi-Fi communication, between the MFP and the mobile terminal are made. This makes it possible, even in a case where the data of a print job is large-volume data, for the mobile terminal to transmit the print job to the MFP by performing Wi-Fi communication (see e.g. Japanese Patent Laid-Open Publication No. 2014-050015).

However, in the technique disclosed in Japanese Patent Laid-Open Publication No. 2014-050015, there is a case where the communication settings cannot be made for the MFP and the mobile terminal. For example, if one of the MFP and the mobile terminal is not equipped with the NFC function, NFC cannot be performed between the MFP and the mobile terminal, and as a result, it is impossible to make communication settings for the MFP and the mobile terminal with ease.

SUMMARY OF THE INVENTION

The present invention provides an information processing apparatus which makes it possible to make communication settings with ease, a method of controlling the information processing apparatus, and a storage medium.

In a first aspect of the present invention, there is provided an information processing apparatus comprising a reception unit configured to receive a packet, a generation unit configured to generate a device list, based on the packet received by the reception unit, a display unit configured to display the device list, a first selection unit configured to select a device from the device list, based on a received radio field intensity of the packet, a second selection unit configured to select a device from the device list, based on a selection operation by a user, and a transmission unit configured to transmit data to the device selected by the first selection unit or the second selection unit.

In a second aspect of the present invention, there is provided a method of controlling an information processing apparatus, comprising receiving a packet, generating a device list, based on the packet received by said receiving, displaying the device list, selecting a device from the device list, based on a received radio field intensity of the packet, selecting a device from the device list, based on a selection operation by a user, and transmitting data to the device selected by said first-mentioned selecting or said second-mentioned selecting.

In a third aspect of the present invention, there is provided a non-transitory computer-readable storage medium storing a computer-executable program for executing a method of controlling an information processing apparatus, wherein the method comprises receiving a packet, generating a device list, based on the packet received by said receiving, displaying the device list, selecting a device from the device list, based on a received radio field intensity of the packet, selecting a device from the device list, based on a selection operation by a user, and transmitting data to the device selected by said first-mentioned selecting or said second-mentioned selecting.

According to the present invention, it is possible to make communication settings with ease.

Further features of the present invention will become apparent from the following description of exemplary embodiments (with reference to the attached drawings).

BRIEF DESCRIPTION OF THE DRAWINGS

FIGS. 6A to 6F are examples of various operation screens of a job transmission application, displayed on a display section appearing in FIG. 2, in which FIG. 6A shows a top screen of the job transmission application, FIG. 6B shows a notification for enabling a Bluetooth function, FIG. 6C shows a notification indicating unavailability of the job transmission application, FIG. 6D shows a notification indicating that a job transmission destination is not set, FIG. 6E shows a notification for terminating the job transmission application, and FIG. 6F shows a screen for setting a job transmission destination.

DESCRIPTION OF THE EMBODIMENTS

The present invention will now be described in detail below with reference to the accompanying drawings showing embodiments thereof.

Although in the present embodiment, the description will be given of a case where the present invention is applied to a mobile terminal as an information processing apparatus, this is not limitative, but the present invention can be applied to any other communication apparatus, insofar as it is a communication apparatus capable of performing wireless communication.

Figure 1:
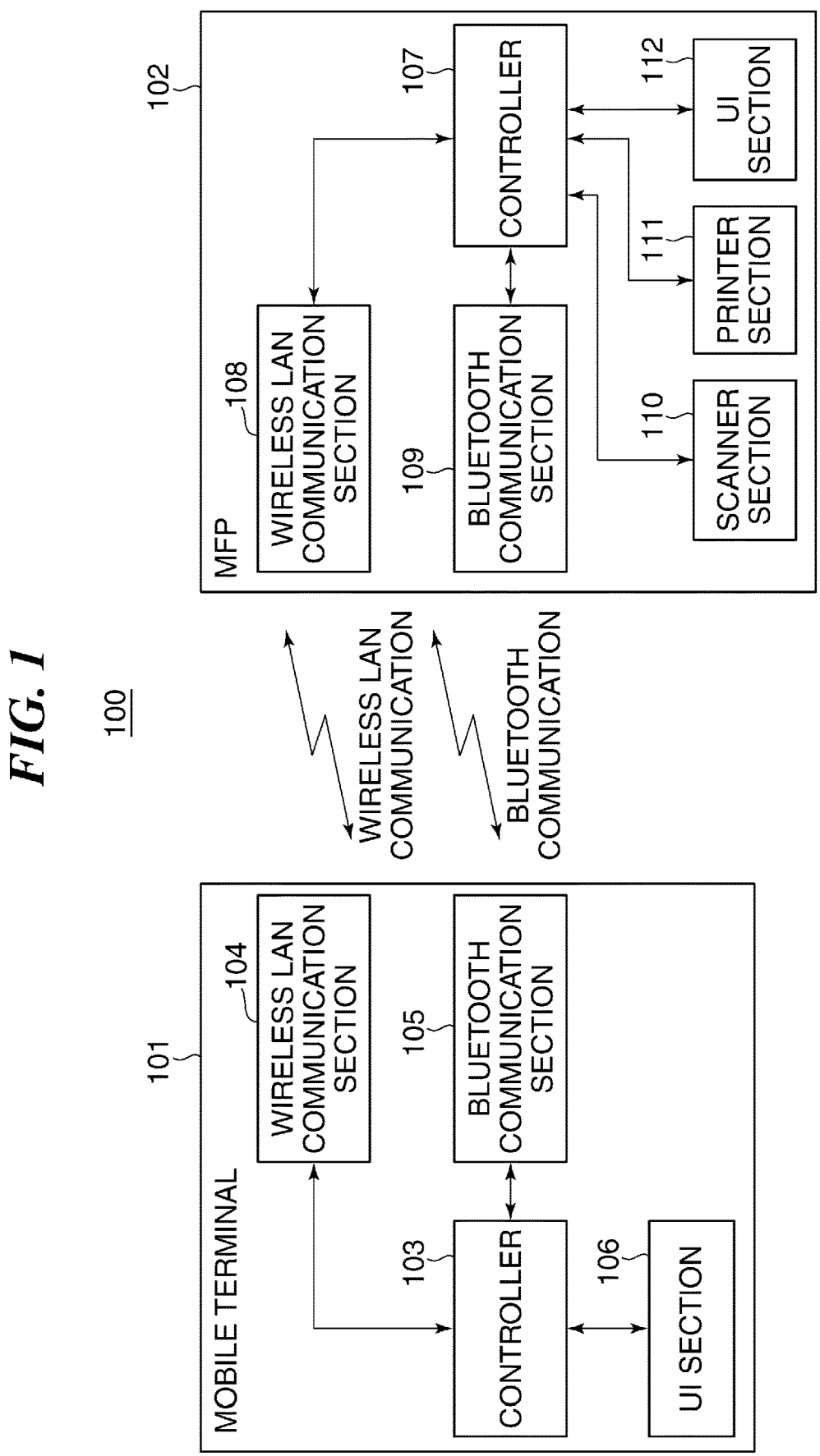
FIG. 1 is a schematic block diagram of a data communication system including a mobile terminal as an information processing apparatus according to an embodiment of the present invention.

FIG. 1 is a schematic block diagram of a data communication system 100 including the mobile terminal as the information processing apparatus according to the embodiment.

Referring to FIG. 1, the data communication system 100 includes the mobile terminal, denoted by reference numeral 101, and an MFP (Multi-Function Peripheral) 102 as the data communication apparatus. The mobile terminal 101 includes a controller 103, a wireless LAN communication section 104, a Bluetooth communication section 105, and a UI (User Interface) section 106. The controller 103 and each of the wireless LAN communication section 104, the Bluetooth communication section 105, and the UI section 106 are connected to each other. The MFP 102 includes a controller 107, a wireless LAN communication section 108, a Bluetooth communication section 109, a scanner section 110, a printer section 111, and a UI section 112. The controller 107 and each of the wireless LAN communication section 108, the Bluetooth communication section 109, the scanner section 110, the printer section 111, and the UI section 112 are connected to each other.

The mobile terminal 101 is one of a mobile phone, such as a smartphone, a tablet PC, a notebook PC, a PDA, and the like. The controller 103 controls each of the components connected to the controller 103. The wireless LAN communication section 104 includes an antenna for performing wireless LAN communication, such as Wi-Fi communication. For example, the mobile terminal 101 performs Wi-Fi communication with the MFP 102 including the wireless LAN communication section 108 via the wireless LAN communication section 104 to transmit a print job of which the data is large-volume data, to the MFP 102. The Bluetooth communication section 105 includes an antenna for performing wireless communication using Bluetooth. For example, the mobile terminal 101 performs BLE (Bluetooth Low Energy) communication with the MFP 102 including the Bluetooth communication section 109 via the Bluetooth communication section 105 to receive communication setting information from the MFP 102, for performing Wi-Fi communication connection to the MFP 102. The UI section 106 is a user interface unit used by a user for operating the mobile terminal 101. In the present embodiment, various settings of a job transmission application, referred to hereinafter, which is used when performing BLE communication, are configured by user's operation of the UI section 106.

The MFP 102 has various functions, such as a print function, a scan function, a copy function, and a FAX function. The controller 107 controls each of the components connected to the controller 107. The wireless LAN communication section 108 includes an antenna for performing wireless LAN communication, such as Wi-Fi communication. The Bluetooth communication section 109 includes an antenna for performing wireless communication using Bluetooth, such as BLE communication. The scanner section 110 performs scan processing based on a control signal sent from the controller 107. For example, the scanner section 110 reads image information of an original placed on an original platen glass, not shown, generates image data based on the read image information, and sends the generated image data to the controller 107. The printer section 111 performs print processing based on a control signal sent from the controller 107. For example, the printer section 111 performs printing on a recording sheet based on the image data sent from the controller 107. The UI section 112 is a user interface unit used by a user for operating the MFP 102.

Figure 2:
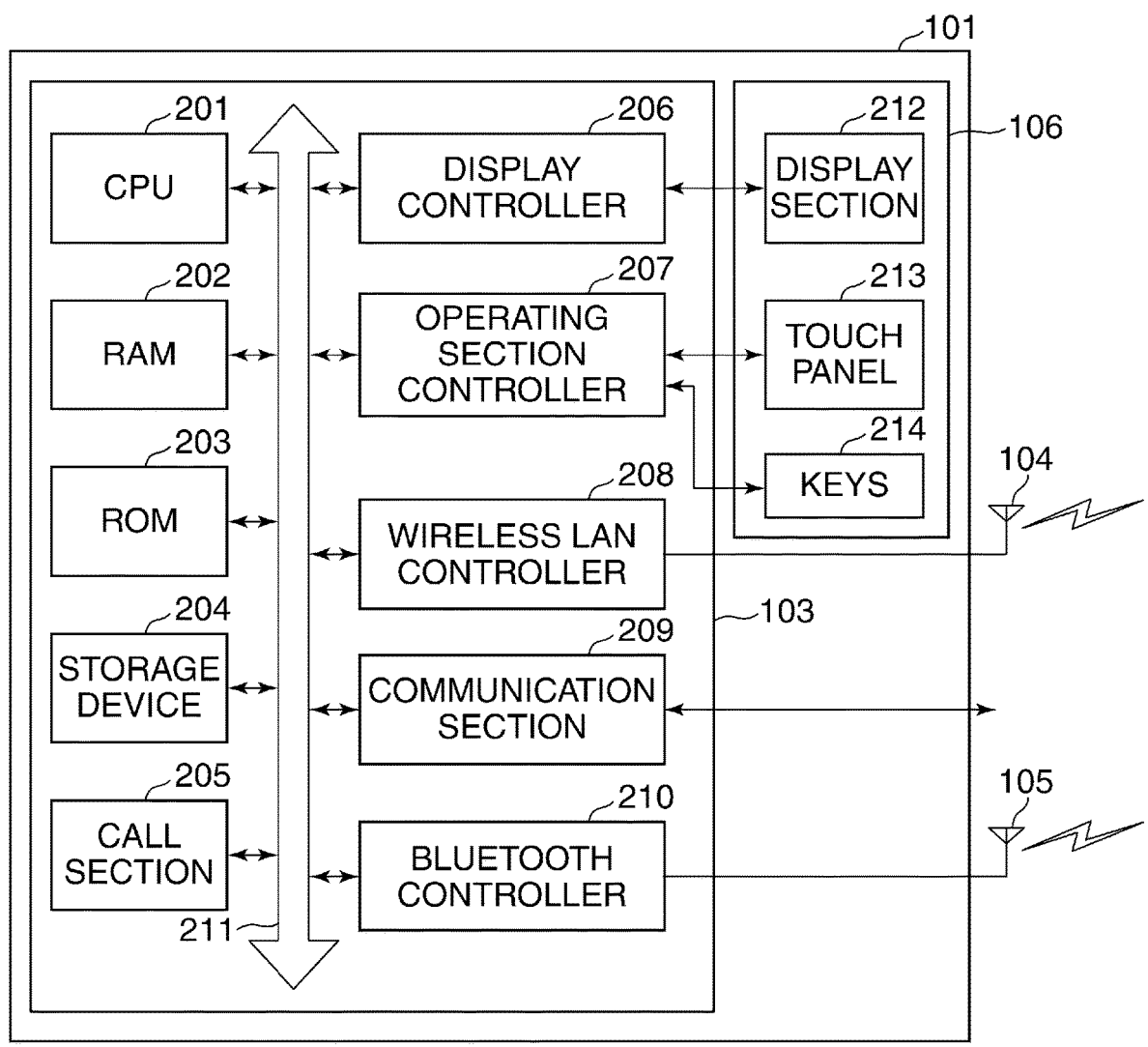
FIG. 2 is a schematic block diagram of the mobile terminal appearing in FIG. 1.

FIG. 2 is a schematic block diagram of the mobile terminal 101 appearing in FIG. 1.

Referring to FIG. 2, the controller 103 includes a CPU 201, a RAM 202, a ROM 203, a storage device 204, a call section 205, a display controller 206, an operating section controller 207, a wireless LAN controller 208, a communication section 209, and a Bluetooth controller 210. These components are interconnected by a bus 211. The UI section 106 includes a display section 212, a touch panel 213, and keys 214.

The CPU 201 performs centralized control of the overall operation of the mobile terminal 101. The RAM 202 is used as a work area for the CPU 201, and further, stores various operation data and various programs used by the CPU 201. The ROM 203 stores various programs used by the CPU 201, image data, and various applications used when the mobile terminal 101 performs BLE communication with the MFP 102. The storage device 204 is a memory device including an SD card and an SSD, for storing large-volume programs and various data. The call section 205 performs voice communication by a telephone function. The display controller 206 performs data communication with the display section 212 of the UI section 106. The operating section controller 207 performs data communication with the touch panel 213 and the keys 214 of the UI section 106. The wireless LAN controller 208 performs data communication with various apparatuses, such as an apparatus having a Wi-Fi communication function, via the wireless LAN communication section 104. The communication section 209 performs data communication with various devices connected to a USB connector, not shown. The Bluetooth controller 210 performs data communication with various apparatuses each having a Bluetooth function. Further, the Bluetooth controller 210 makes a setting for enabling or disabling the Bluetooth function of the mobile terminal 101 based on setting information for controlling the Bluetooth function (hereinafter referred to as the "BT setting information"), which is set by user's operation of the UI section 106. The display section 212 displays various operation screens according to control signals sent from the display controller 206. In the present embodiment, before transmitting a job for executing various processing operations to the MFP 102, the display section 212 displays the operation screens of the job transmission application, referred to hereinafter, for transmitting the job. The touch panel 213 and the keys 214 transmit various setting information set by user's operation of the touch panel 213 and the keys 214 to the operating section controller 207.

Figure 3:
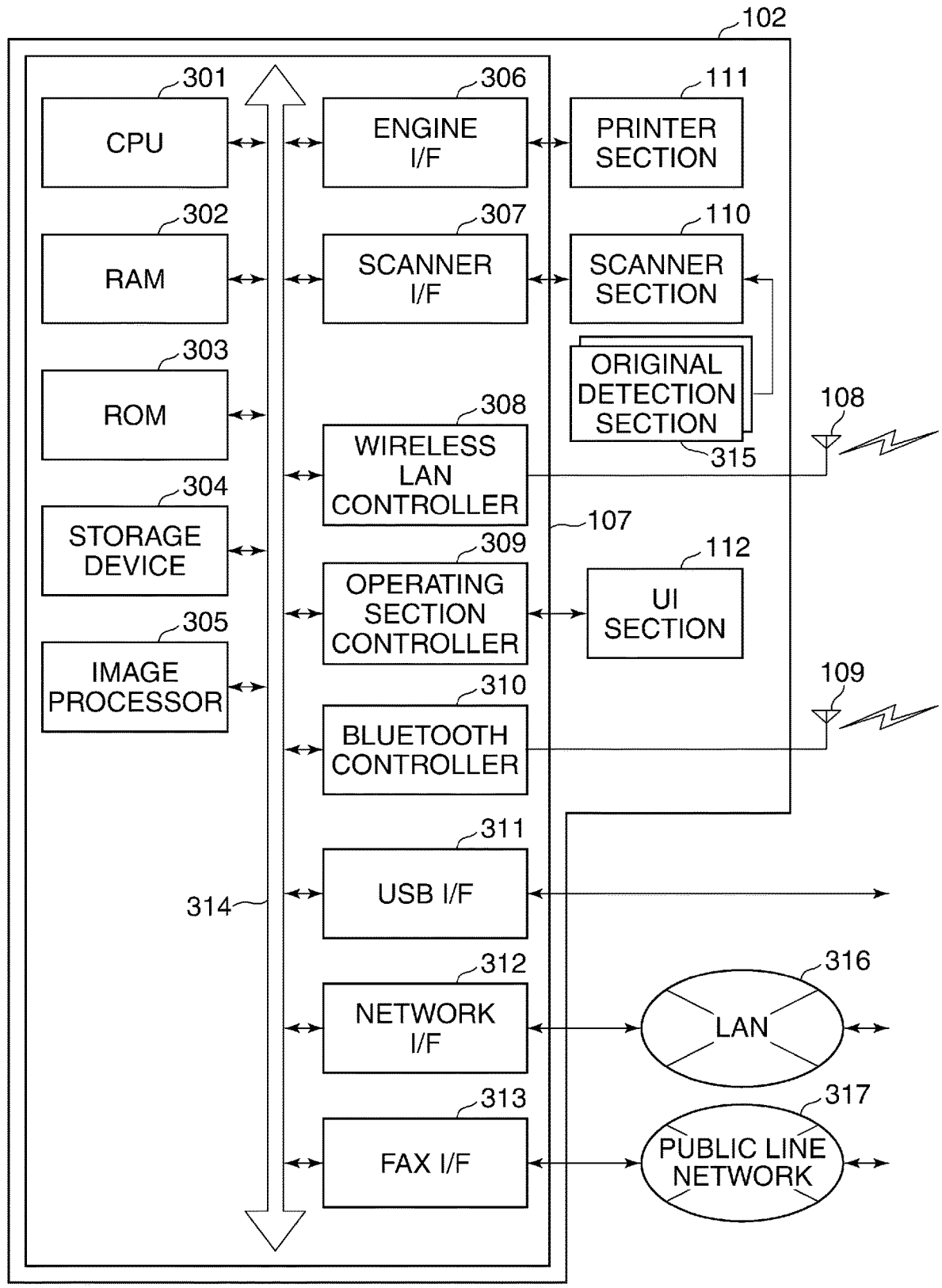
FIG. 3 is a schematic block diagram of an MFP appearing in FIG. 1.

FIG. 3 is a schematic block diagram of the MFP 102 appearing in FIG. 1.

Referring to FIG. 3, the MFP 102 includes an original detection section 315, in addition to the controller 107, the wireless LAN communication section 108, the Bluetooth communication section 109, the scanner section 110, the printer section 111, and the UI section 112, which are described with reference to FIG. 1. The controller 107 includes a CPU 301, a RAM 302, a ROM 303, a storage device 304, an image processor 305, an engine interface 306, a scanner interface 307, a wireless LAN controller 308, an operating section controller 309, a Bluetooth controller 310, a USB interface 311, a network interface 312, and a FAX interface 313. These components are interconnected by a bus 314.

The CPU 301 performs centralized control of the overall operation of the MFP 102. The RAM 302 is used as a work area for the CPU 301, and further, stores various operation data and various programs used by the CPU 301. The RAM 302 stores image data subjected to image processing performed by the image processor 305, and the ROM 303 stores various programs used by the CPU 301, image data, and setting data. The storage device 304 is a memory device including an HDD and an SSD, for storing large-volume programs and various data. The engine interface 306 performs data communication with the printer section 111. The scanner interface 307 performs data communication with the scanner section 110. The wireless LAN controller 308 performs data communication with various apparatuses, such as an apparatus having the Wi-Fi communication function, via the wireless LAN communication section 108. The operating section controller 309 performs data communication with the UI section 112. The Bluetooth controller 310 performs data communication with various apparatuses each having the Bluetooth function, via the Bluetooth communication section 109. The USB interface 311 performs data communication with various devices connected to a USB connector, not shown. The network interface 312 performs network communication with various apparatuses connected to a LAN 316. The FAX interface 313 performs facsimile communication with other MFPs each having a facsimile communication function and connected to a public line network 317. The original detection section 315 detects whether or not an original is placed on the original platen glass, and when the original detection section 315 detects an original placed on the original platen glass, it notifies the CPU 301 of the detection.

Next, BLE communication performed in the data communication system 100 will be described.

Figure 4:
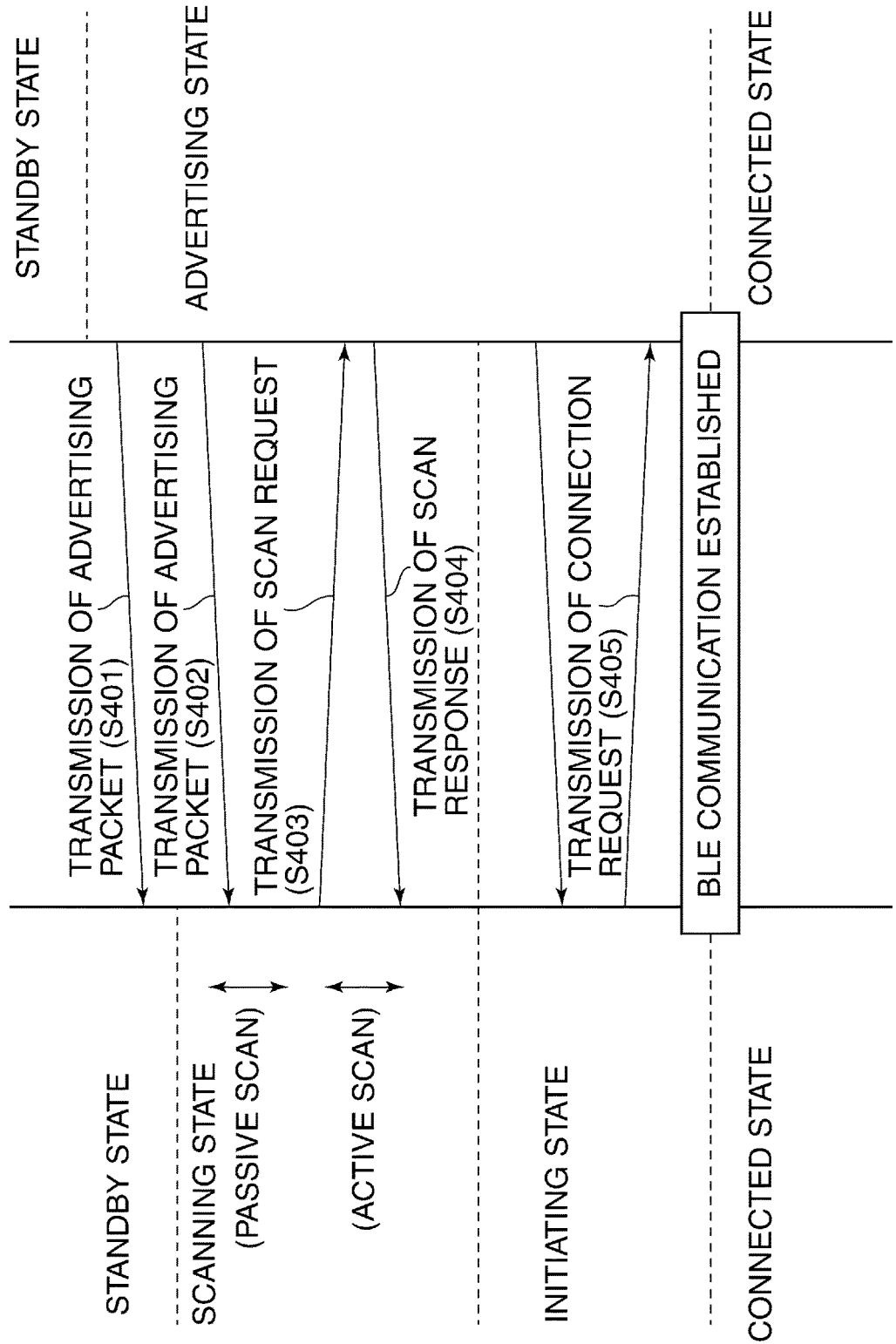
FIG. 4 is a sequence diagram useful in explaining BLE communication performed in the data communication system.

FIG. 4 is a sequence diagram useful in explaining BLE communication performed in the data communication system 100 shown in FIG. 1.

Referring to FIG. 4, first, the mobile terminal 101 and the MFP 102 are both in a standby state in which packet communication is not performed. Then, when transmission of an advertising packet is instructed by the CPU 301, the MFP 102 shifts to an advertising state, and transmits the advertising packet to an unspecified number of destinations (hereinafter referred to as the "broadcast transmission") simultaneously (step S401). The advertising packet includes a model name (apparatus name) and address information that identifies the MFP 102, a Tx power level indicative of a radio field intensity of radio waves transmitted from the MFP 102, UUID (Universally Unique IDentifier) information of the MFP 102, and so forth. From then on, the MFP 102 continuously transmits an advertising packet by broadcast transmission at fixed intervals (step S402). In the present embodiment, as the type of the advertising packet transmitted by broadcast transmission, ADV_IND for connecting to an unspecified large number of apparatuses is used.

On the other hand, when the scan of the advertising packet is instructed by the CPU 201, the mobile terminal 101 shifts to a scanning state, and receives the advertising packet transmitted by broadcast transmission. The scanning state includes two scanning states: passive scan and active scan. When the mobile terminal 101 shifts from the standby state to the scanning state, the scanning state is passive scan. When the advertising packet transmitted by broadcast transmission is received during the passive scan, the mobile terminal 101 analyzes the received advertising packet, and identifies a transmission source of the advertising packet. The mobile terminal 101 transmits a scan request (SCAN_REQ) to the identified transmission source, i.e. the MFP 102, for requesting transmission of detailed information of the MFP 102 (step S403). At this time, the scan state of the mobile terminal 101 is shifted from passive scan to active scan.

Then, the MFP 102 transmits a scan response (SCAN_RESP) including the detailed information of the MFP 102 to the mobile terminal 101 in response to the scan request (SCAN_REQ) transmitted from the mobile terminal 101 (step S404). The mobile terminal 101 stores the detailed information of the MFP 102, included in the received scan response, e.g. in the RAM 202, determines the MFP 102 as a connection destination by performing a job transmission process described hereinafter with reference to FIG. 5, and shifts to an initiating state. Upon receipt of the advertising packet transmitted from the MFP 102, the mobile terminal 101 having shifted to the initiating state transmits to the MFP 102 a connection request (CONNET_REQ) for requesting BLE communication connection thereto (step S405). Upon receipt of the connection request (CONNET_REQ) transmitted from the mobile terminal 101, the MFP 102 performs BLE communication connection. By this connection, BLE communication between the mobile terminal 101 and the MFP 102 is established, and the mobile terminal 101 and the MFP 102 shift to a connected stat, followed by terminating the present process.

Next, the job transmission process for transmitting a job for executing various processing, such as print processing, from the mobile terminal 101 will be described. In the present embodiment, the description will be given, by way of example, of a case where Wi-Fi communication is used for data communication for transmitting a job.

Figure 5:
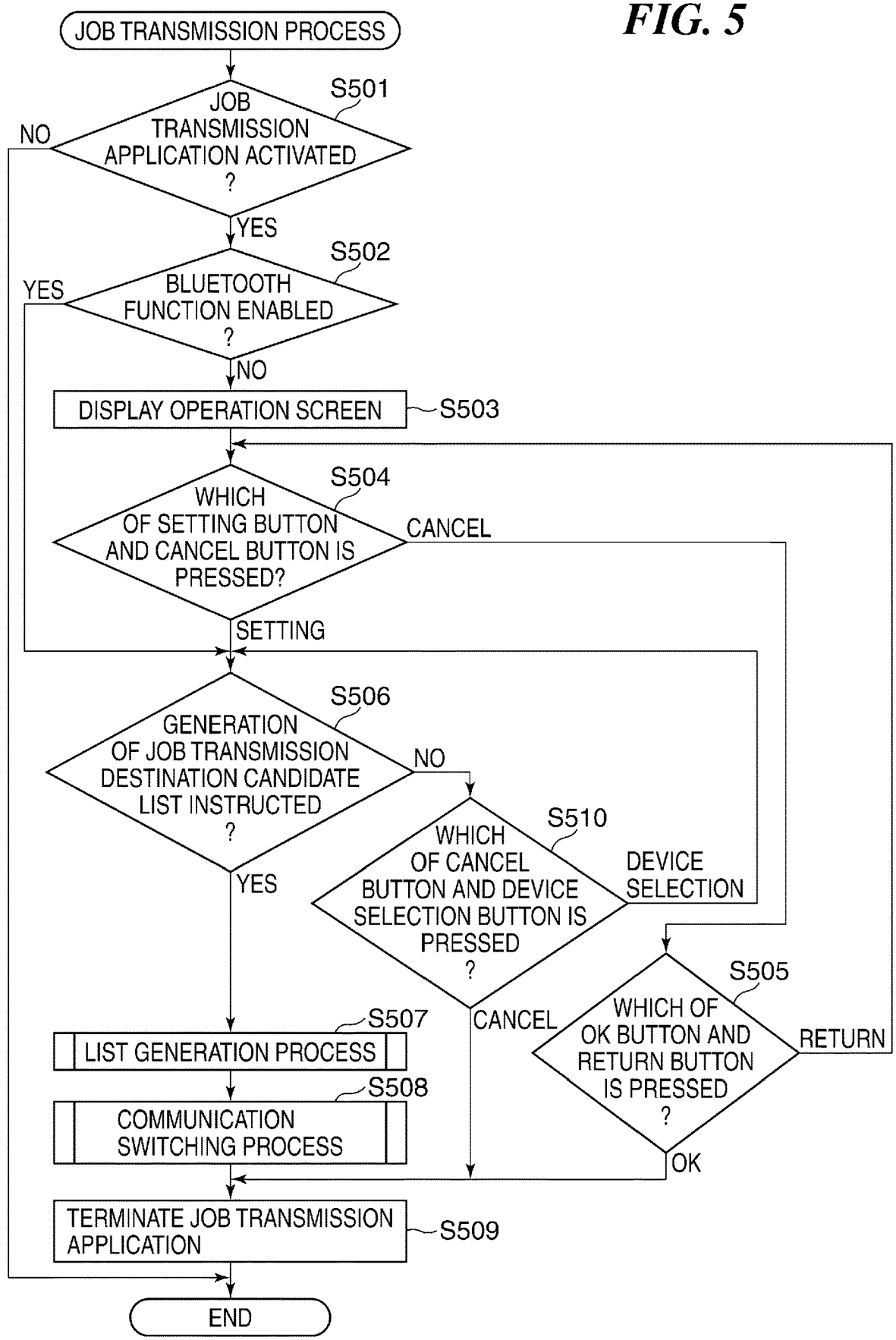
FIG. 5 is a flowchart of a job transmission process performed by the mobile terminal.

FIG. 5 is a flowchart of the job transmission process performed by the mobile terminal 101.

The job transmission process in FIG. 5 is performed by the CPU 201 of the mobile terminal 101, which executes programs stored in the ROM 203 and the storage device 204.

Figure 6A:
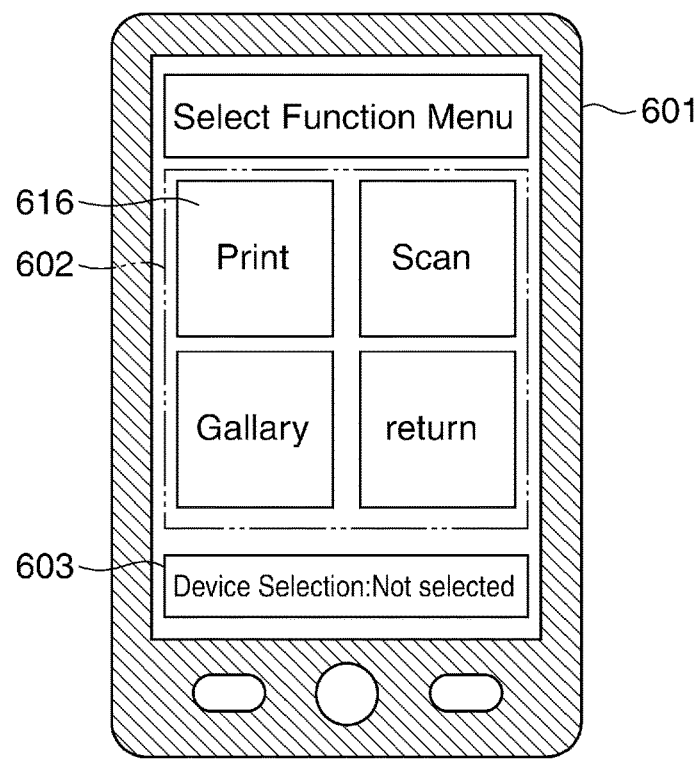

Referring to FIG. 5, first, the CPU 201 determines whether or not the job transmission application for making settings of a job to be transmitted has been activated (step S501). If the job transmission application is activated, a top screen 601 shown in FIG. 6A is displayed on the display section 212 of the mobile terminal 101. The top screen 601 displays a setting button group 602 for setting various jobs to be transmitted by the job transmission application and a device selection button 603 for setting a job transmission destination.

If it is determined in the step S501 that the job transmission application has been activated, the CPU 201 determines whether or not the Bluetooth function of the mobile terminal 101 has been enabled (step S502). In the present embodiment, the enabling or disabling of the Bluetooth function is set based on the BT setting information set by user's operation of the UI section 106.

If it is determined in the step S502 that the Bluetooth function has been enabled, the CPU 201 proceeds to a step S506 without executing steps S503 and S504.

Figure 6B:
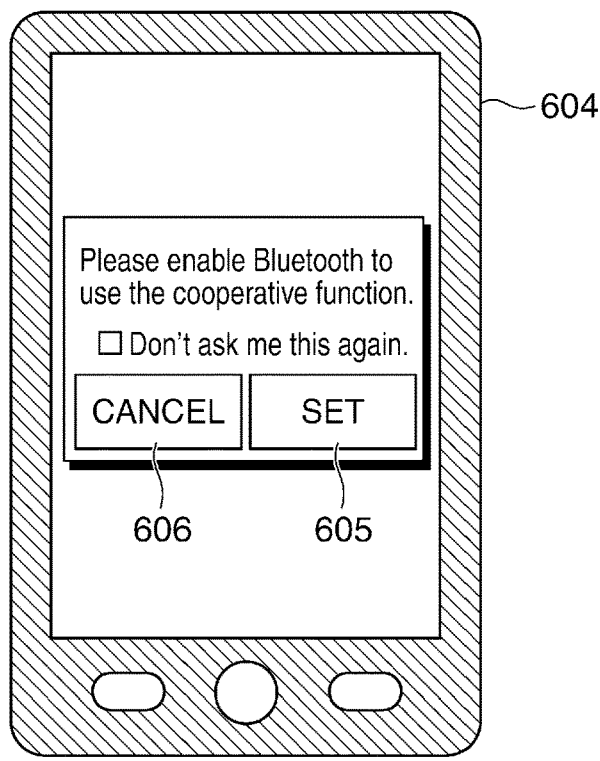

If it is determined in the step S502 that the Bluetooth function has been disabled, the CPU 201 displays an operation screen 604, shown in FIG. 6B, for prompting the user to make a setting for enabling the Bluetooth function (step S503). Then, the CPU 201 determines which of a setting button 605 for making a setting for enabling the Bluetooth function and a cancel button 606 for not making a setting for enabling the Bluetooth function has been pressed on the operation screen 604 (step S504).

Figure 6C:
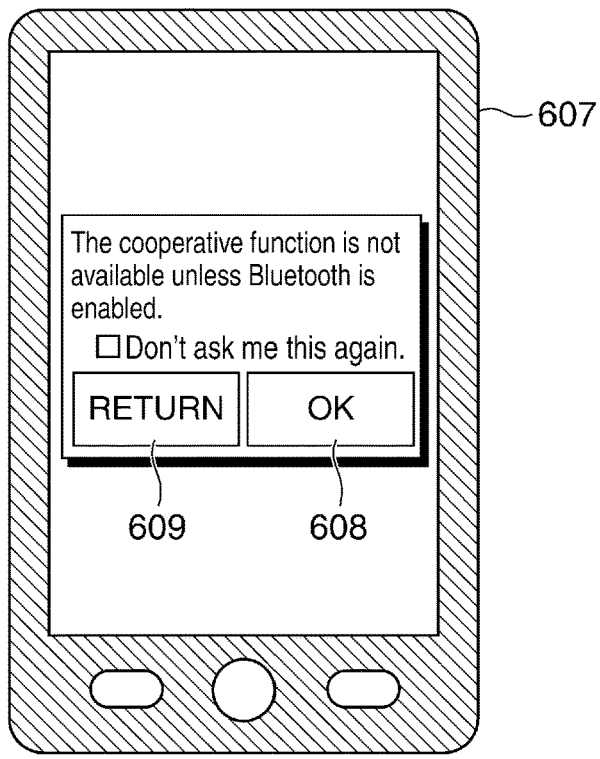

If it is determined in the step S504 that the cancel button 606 has been pressed, the CPU 201 displays an operation screen 607 shown in FIG. 6C on the display section 212 so as to notify the user that the job transmission process cannot be performed. Then, the CPU 201 determines whether or not which of an OK button 608 and a return button 609 has been pressed on the operation screen 607 (step S505).

If it is determined in the step S505 that the OK button 608 has been pressed, the CPU 201 proceeds to a step S509.

If it is determined in the step S505 that the return button 609 has been pressed, the CPU 201 returns to the step S504.

Figure 6D:
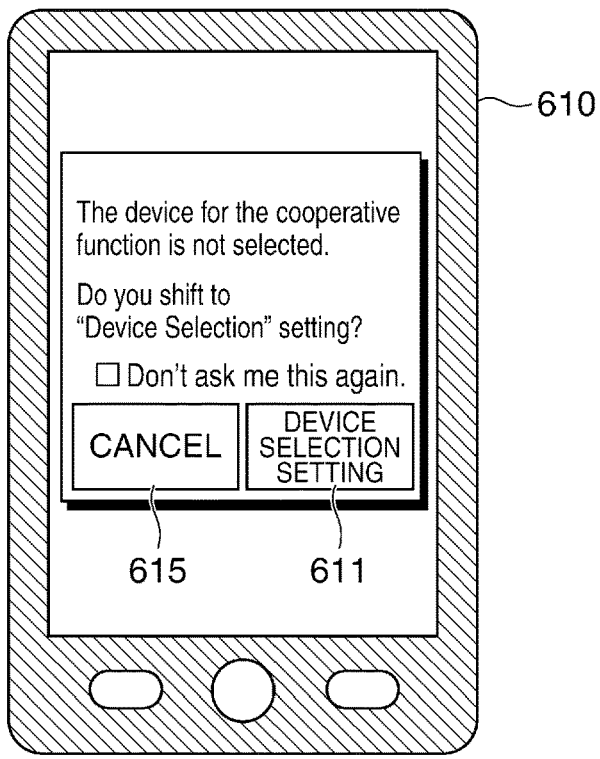

If it is determined in the step S504 that the setting button 605 has been pressed, the CPU 201 makes a setting for enabling the Bluetooth function, and determines whether or not generation of a job transmission destination candidate list has been instructed (step S506). The job transmission destination candidate list records a model name (apparatus name) that identifies an apparatus capable of performing BLE communication as a candidate of a job transmission destination (hereinafter referred to as the "job transmission destination candidate apparatus") out of a plurality of apparatuses compatible with the job transmission application (hereinafter referred to as the "application-compatible apparatus"), which are set in advance. In the present embodiment, for example, if the device selection button 603 for setting a job transmission destination is pressed on the top screen 601, or if a device selection setting button 611 for setting a job transmission destination is pressed on an operation screen 610, shown in FIG. 6D, which is displayed for notifying the user that the job transmission destination has not been set, the CPU 201 determines that generation of the job transmission destination candidate list has been instructed.

Figure 6E:
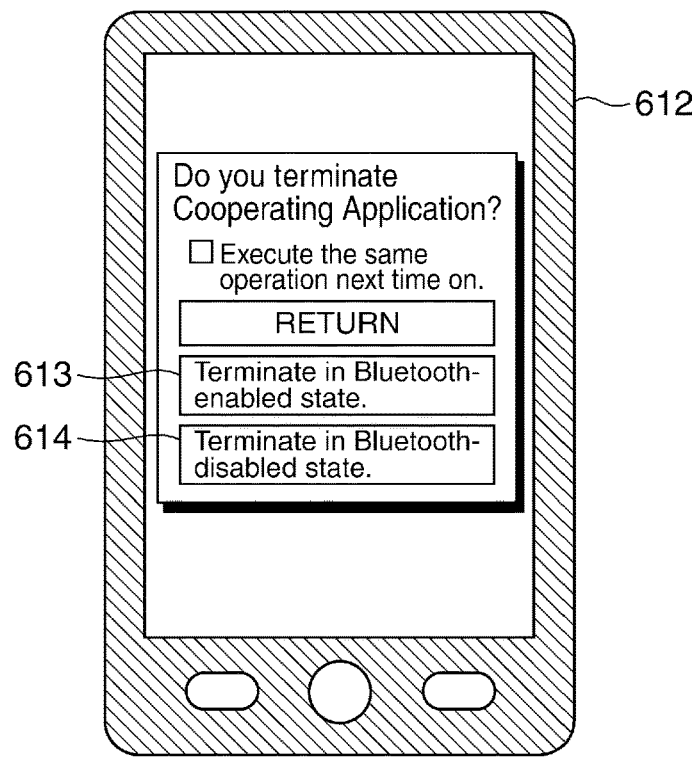
Figure 7:
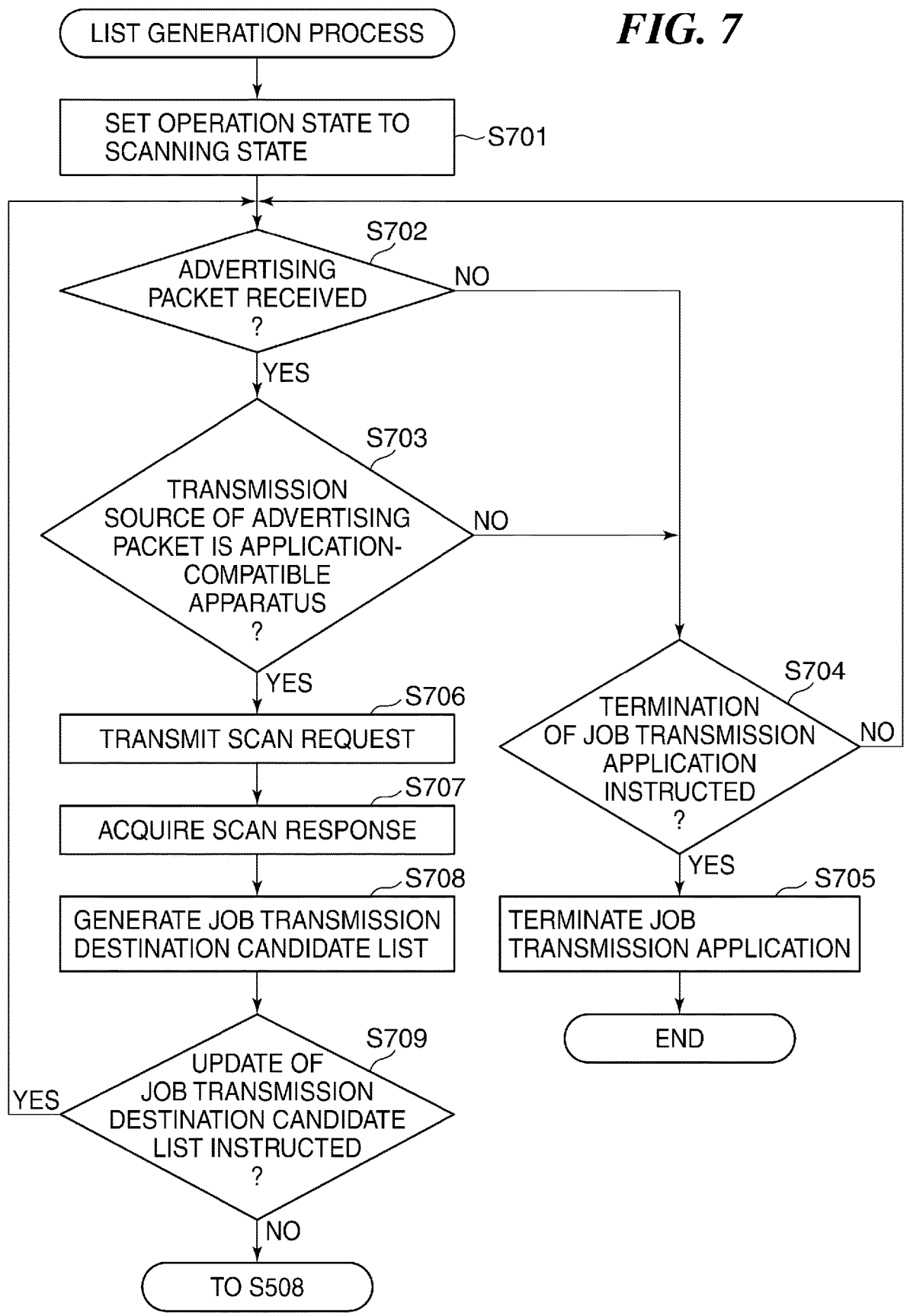
FIG. 7 is a flowchart of a list generation process performed by the mobile terminal.

If it is determined in the step S506 that generation of the job transmission destination candidate list has been instructed, the CPU 201 performs a list generation process in FIG. 7, and thereby generates the job transmission destination candidate list (step S507). Then, by performing a communication switching process described hereinafter with reference to FIG. 8, the CPU 201 performs BLE communication connection to an apparatus which is determined, based on the job transmission destination candidate list, as a destination to which the job is to be transmitted (hereinafter referred to as the "job transmission destination apparatus"), and makes settings for Wi-Fi-communication with the job transmission destination apparatus based on the communication setting information for Wi-Fi communication connection, acquired by BLE communication (step S508). Then, when termination of the job transmission application is instructed by the user, the CPU 201 terminates the job transmission application (step S509). In the present embodiment, when termination of the job transmission application is instructed by the user, an operation screen 612, shown in FIG. 6E, for making a setting for the Bluetooth function before terminating the job transmission application is displayed on the display section 212. When a button 613 is pressed on the operation screen 612, the CPU 201 terminates the job transmission application in a state where the Bluetooth function is held enabled, whereas when a button 614 is pressed on the operation screen 612, the CPU 201 makes a setting for disabling the Bluetooth function and terminates the job transmission application, whereafter the present process is terminated. Note that in a case where the user instructs termination of the job transmission application either in the list generation process performed in the step S507, which is described in detail hereinafter with reference to FIG. 7, or in the communication switching process performed in the step S508, which is described in detail hereinafter with reference to FIG. 8, the present process is also terminated.

If it is determined in the step S506 that generation of the job transmission destination candidate list has not been instructed, the CPU 201 displays the operation screen 610 on the display section 212, and determines which of a cancel button 615 and the device selection setting button 611 has been pressed on the operation screen 610 (step S510).

If it is determined in the step S510 that the device selection setting button 611 has been pressed, the CPU 201 returns to the step S506.

If it is determined in the step S501 that the job transmission application has not been activated, the CPU 201 determines that the job transmission process using the job transmission application is not performed, and terminates the present process.

If it is determined in the step S510 that cancel button 615 has been pressed on the operation screen 610, the CPU 201 executes the step S509, and terminates the present process.

FIG. 7 is a flowchart of the list generation process performed by the mobile terminal 101 in the step S507 of the job transmission process in FIG. 5.

Referring to FIG. 7, first, the CPU 201 shifts the operation state of the Bluetooth controller 210 from the standby state to the scanning state, as described with reference FIG. 4 (step S701). Then, the CPU 201 determines whether or not an advertising packet has been received via the Bluetooth communication section 105 (step S702). Note that an advertising packet is transmitted e.g. from each of a plurality of apparatuses capable of performing BLE communication by broadcast transmission. In the present embodiment, the step S702 and steps S703 and S706, referred to hereinafter, are executed with respect to the advertising packet transmitted from each of the plurality of apparatuses by broadcast transmission.

If it is determined in the step S702 that an advertising packet has been received, the CPU 201 determines whether or not the transmission source of the received advertising packet (hereinafter referred to as the "packet transmission source") is an application-compatible apparatus (step S703). In the step S703, the CPU 201 determines whether or not the transmission source of the received advertising packet is an application-compatible apparatus, based on the address information, UUID information, and data identifiable by the job transmission application, which are included in the advertising packet, for identification of the transmission source of the advertising packet.

If it is determined in the step S703 that the packet transmission source is an application-compatible apparatus, the CPU 201 causes the Bluetooth controller 210 to transmit a scan request (SCAN_REQ) to the packet transmission source, for requesting transmission of detailed information of the packet transmission source (step S706). Then, the CPU 201 acquires a scan response (SCAN_RESP) transmitted from the packet transmission source via the Bluetooth controller 210 (step S707). The scan response (SCAN_RESP) includes a model name that identifies the packet transmission source, and information on various processing operations which can be performed by the packet transmission source, such as information on printable sheet sizes and types.

Then, the CPU 201 generates the job transmission destination candidate list based on the acquired scan response (SCAN_RESP) (step S708). More specifically, in the present embodiment, out of the plurality of application-compatible apparatuses, only the model name corresponding to the packet transmission source which has transmitted the scan response (SCAN_RESP) is recorded in the job transmission destination candidate list. In the step S708, for example, if the CPU 201 does not receive an advertising packet from a packet transmission source corresponding to a model name recorded in the job transmission destination candidate list via the Bluetooth controller 210 for a specified time period, the model name corresponding to this packet transmission source is deleted from the job transmission destination candidate list. Then, the CPU 201 determines whether or not the update of the job transmission destination candidate list is instructed by the user (step S709).

If it is determined in the step S709 that the update of the job transmission destination candidate list is instructed, the CPU 201 returns to the step S702, whereas if the update of the job transmission destination candidate list is not instructed, the CPU 201 proceeds to the step S508 in FIG. 5.

If it is determined in the step S702 that an advertising packet has not been received, or if it is determined in the step S703 that the transmission source of the received advertising packet is not an application-compatible apparatus, the CPU 201 determines whether or not termination of the job transmission application is instructed by the user (step S704).

If it is determined in the step S704 that termination of the job transmission application is not instructed, the CPU 201 returns to the step S702, whereas if termination of the job transmission application is instructed, the CPU 201 terminates the job transmission application (step S705), followed by terminating the present process.

Figure 8:
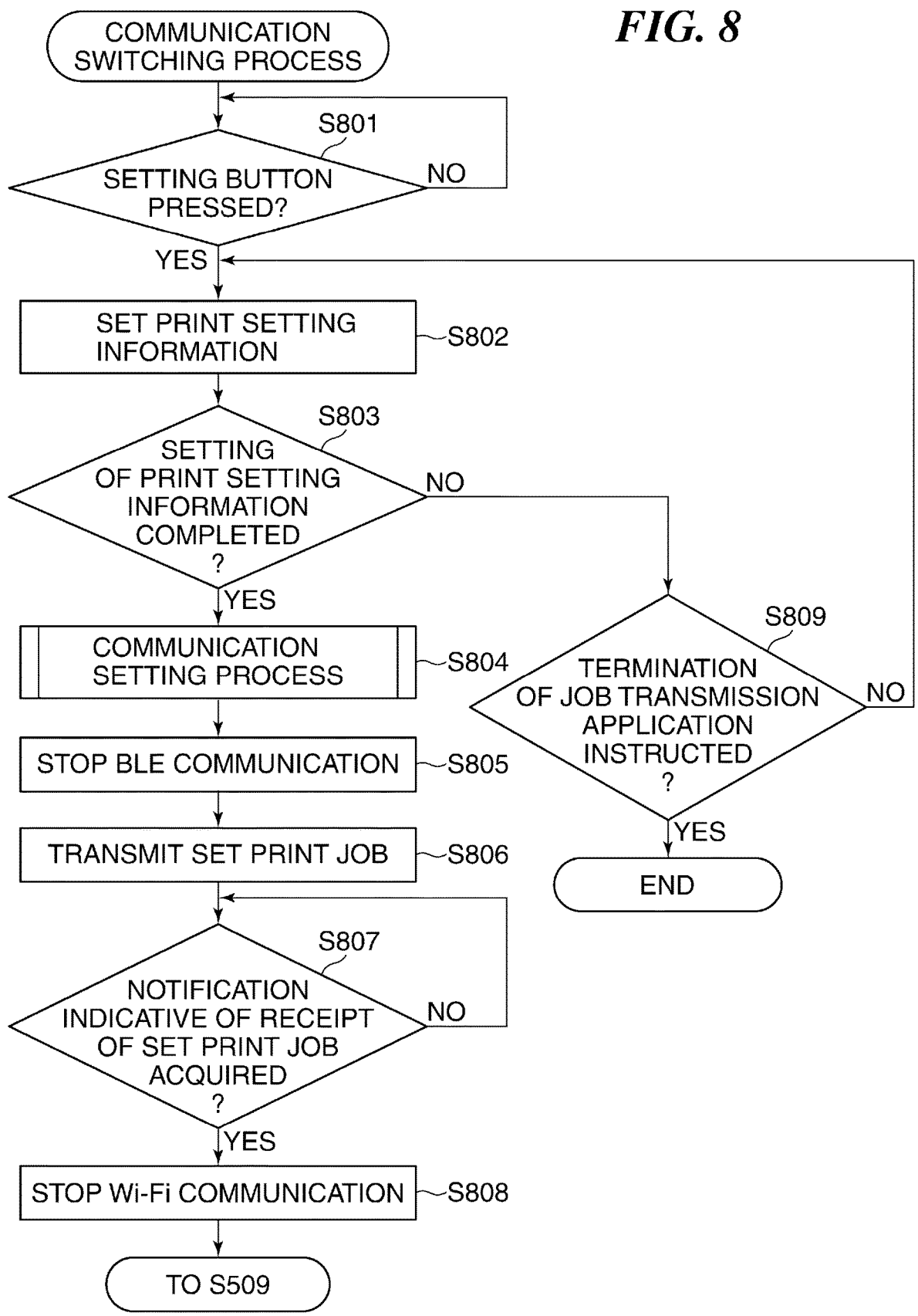
FIG. 8 is a flowchart of a communication switching process performed by the mobile terminal.

FIG. 8 is a flowchart of the communication switching process performed by the mobile terminal 101 in the step S508 of the job transmission process in FIG. 5.

Referring to FIG. 8, first, the CPU 201 determines whether or not a setting button 616 for performing the setting of print processing has been pressed by the user on the top screen 601 (step S801), and if the setting button 616 has been pressed (YES to the step S801), the CPU 201 sets print setting information for executing print processing based on user's operation of the UI section 106 (step S802). Then, the CPU 201 determines whether or not the setting of the print setting information is completed (step S803).

If it is determined in the step S803 that the setting of the print setting information is completed, the CPU 201 performs a communication setting process, described in detail hereinafter with reference to FIGS. 9A and 9B, to thereby make communication settings for transmitting a print job to the job transmission destination apparatus determined using BLE communication (step S804). More specifically, in the step S804, in order to transmit the print job, which has been generated based on the print setting information set in the step S802 (hereinafter referred to as the "set print job"), to the job transmission destination apparatus determined using BLE communication, communication settings for Wi-Fi communication are made. Then, the CPU 201 cancels the communication settings for BLE communication to stop BLE communication (step S805). Then, the CPU 201 transmits the set print job to the MFP 102 using Wi-Fi communication via the wireless LAN communication section 104 (step S806). Then, when a notification indicating receipt of the set print job is acquired from the MFP 102 (YES to a step S807), the CPU 201 cancels the communication settings for Wi-Fi communication, stops Wi-Fi communication (step S808), and proceeds to the step S509 in FIG. 5.

If it is determined in the step S803 that the setting of the print setting information is not completed, the CPU 201 determines whether or not termination of the job transmission application is instructed by the user (step S809).

If it is determined in the step S809 that termination of the job transmission application is not instructed by the user, the CPU 201 returns to the step S802.

If it is determined in the step S809 that termination of the job transmission application is instructed by the user, the CPU 201 terminates the present process.

Figure 9A:
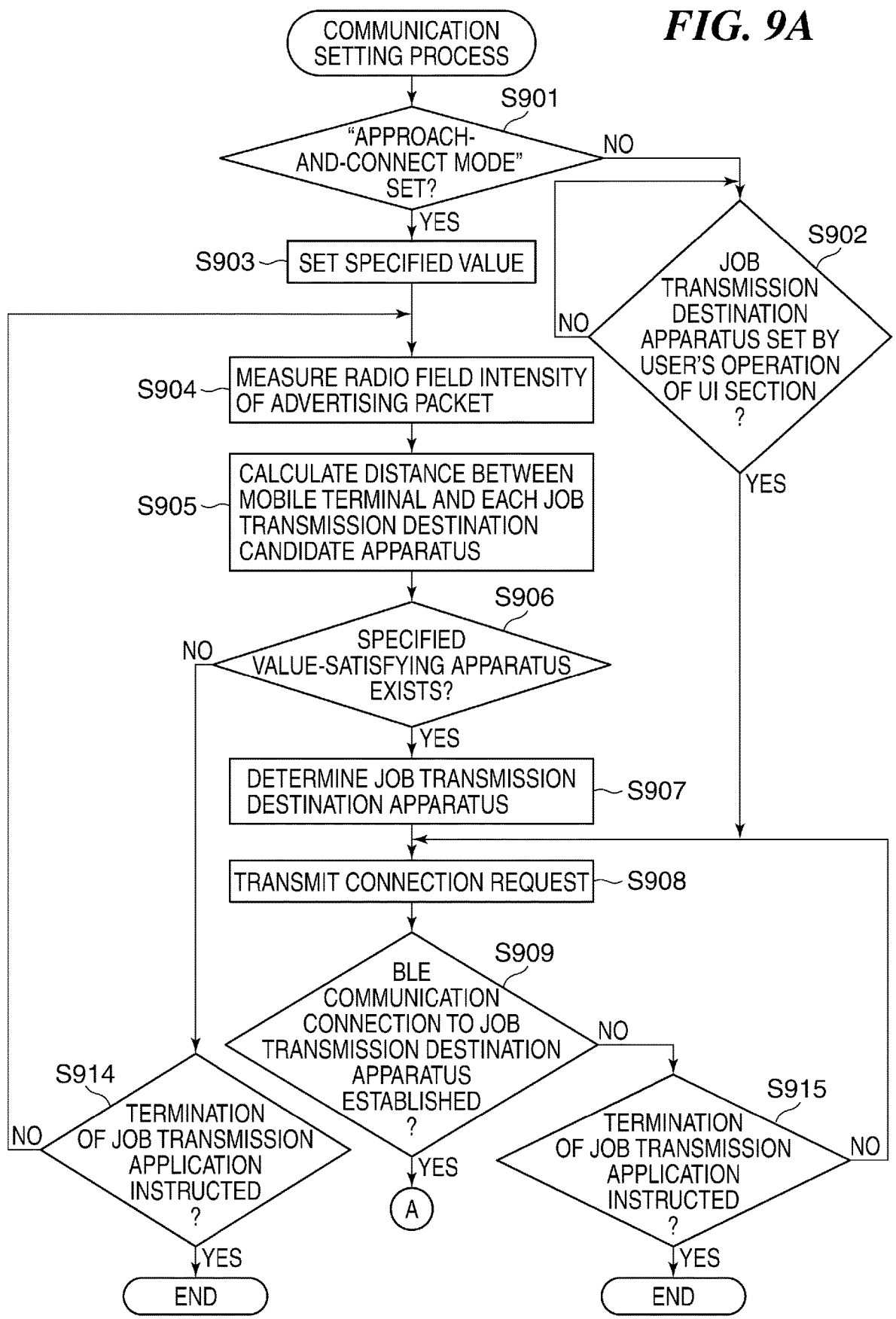
FIG. 9A is a flowchart of a communication setting process performed by the mobile terminal.
Figure 9B:
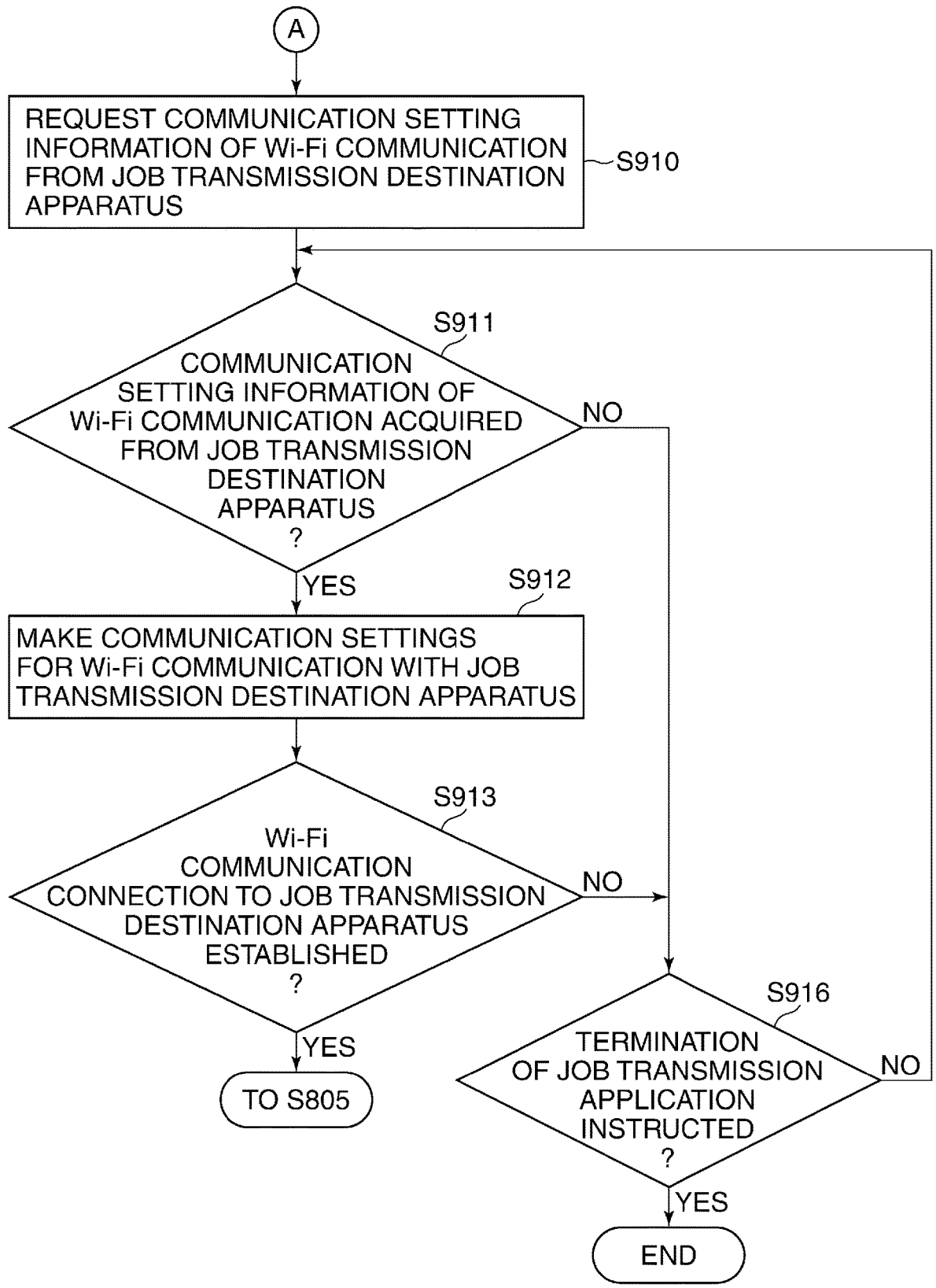
FIG. 9B is a continuation of FIG. 9A.

FIGS. 9A and 9B are a flowchart of the communication setting process performed by the mobile terminal 101 in the step S804 of the communication switching process in FIG. 8.

In the present example, the data of the set print job is assumed to be large-volume data including various print setting information used for print processing, and hence short-distance wireless communication, such as NFC, which is low in communication speed, is not suitable for transmission of the set print job. For this reason, to transmit the set print job from the mobile terminal 101 to the MFP 102, it is necessary to make communication settings for performing wireless communication suitable for transmission of large-volume data, such as Wi-Fi communication. To facilitate making communication settings for Wi-Fi communication, it is envisaged, for example, that the communication setting information is transmitted from the MFP 102 to the mobile terminal 101 using NFC, and the communication settings for Wi-Fi communication are made based on the transmitted communication setting information. However, NFC is not in widespread use, and there are many devices which are not equipped with the NFC function. Therefore, for example, if one of the mobile terminal 101 and the MFP 102 is not equipped with the NFC function, NFC cannot be performed between the mobile terminal 101 and the MFP 102, and as a result, it is impossible to facilitate making communication settings for the mobile terminal 101 and the MFP 102.

To solve this problem, in the present embodiment, distances from the mobile terminal 101 to the job transmission destination candidate apparatuses are calculated using BLE communication in widespread use, and one of the job transmission destination candidate apparatuses is determined, based on the calculated distances, as the job transmission destination apparatus, whereby the communication setting information of Wi-Fi communication is transmitted from the determined job transmission destination apparatus to the mobile terminal 101.

Referring to FIGS. 9A and 9B, first, the CPU 201 determines whether or not an "approach-and-connect mode" is set for determining a job transmission destination apparatus based on distances to job transmission destination candidate apparatuses, which are calculated using BLE communication (step S901).

Figure 6F:
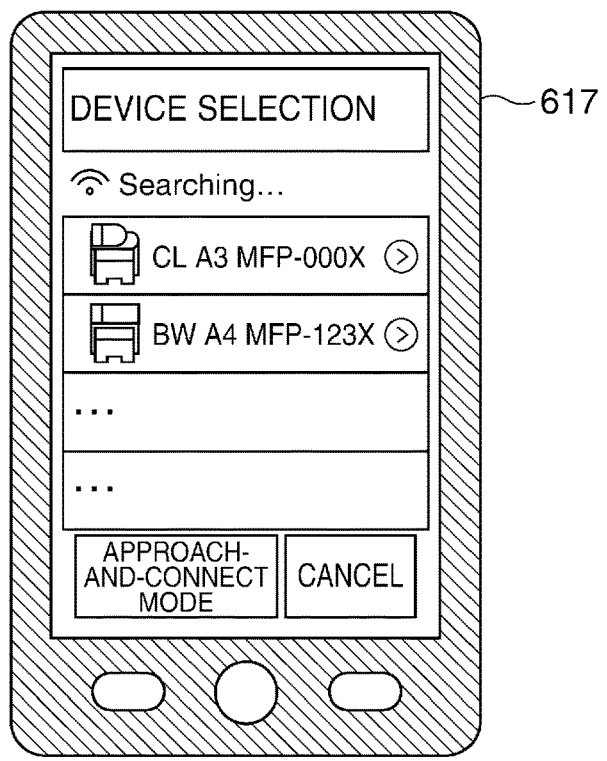

In a case where it is determined in the step S901 that the "approach-and-connect mode" is not set, when the job transmission destination apparatus is set by user's operation of the UI section 106 (YES to a step S902), the CPU 201 proceeds to a step S908. In the present embodiment, when the device selection button 603 on the top screen 601 is pressed by the user, for example, an operation screen 617 shown in FIG. 6F for setting the job transmission destination apparatus is displayed on the display section 212. The operation screen 617 displays the model names recorded in the job transmission destination candidate list generated in the step S707. In the step S902, when the user selects one of the plurality of model names displayed on the operation screen 617, a job transmission destination candidate apparatus corresponding to the selected model name is determined as the job transmission destination apparatus.

If it is determined in the step S901 that the "approach-and-connect mode" is set, the CPU 201 sets a specified value for determining a job transmission destination apparatus, which is used in a step S906, referred to hereinafter (step S903). The specified value is set to a distance to a job transmission destination apparatus within which the user having the mobile terminal 101 can operate the job transmission destination apparatus, and in the present embodiment, the specified value is set to a value e.g. within a range of 30 cm to 1 m. Although in the step S903, the specified value is stored in the ROM 203 in advance, the specified value may be set by user's operation of the UI section 106. Then, the CPU 201 measures a radio field intensity of an advertising packet transmitted from each of the job transmission destination candidate apparatuses corresponding to the model names recorded in the job transmission destination candidate list generated in the step S707 in FIG. 7 (step S904). Then, the CPU 201 acquires a Tx power level included in each transmitted advertising packet, and calculates a distance between the mobile terminal 101 and each job transmission destination candidate apparatus based on the measured radio field intensity and the acquired Tx power level (step S905). More specifically, in the step S905, the CPU 201 calculates, based the Tx power level included in the advertising packet transmitted from each job transmission destination candidate apparatus and the radio field intensity measured in the step S904 based on a intensity of electric wave transmitted from the job transmission destination candidate apparatus and received by the mobile terminal 101 (hereinafter referred to as the "received radio field intensity"), a distance between the mobile terminal 101 and the job transmission destination candidate apparatus. Then, the CPU 201 determines whether or not there is an apparatus which is shorter in distance from the mobile terminal 101 than the specified value set in the step S903 (hereinafter referred to as the "specified value-satisfying apparatus") among the job transmission destination candidate apparatuses (step S906).

If it is determined in the step S906 that there is a specified value-satisfying apparatus, the CPU 201 determines the specified value-satisfying apparatus as the job transmission destination apparatus (step S907). Then, the CPU 201 transmits to the job transmission destination apparatus a connection request (CONNECT_REQ) for requesting BLE communication connection thereto (step S908). Then, the CPU 201 determines whether or not BLE communication connection to the job transmission destination apparatus has been established (step S909).

If it is determined in the step S909 BLE communication connection to the job transmission destination apparatus has been established, the process proceeds to a step S910 in FIG. 9B, wherein the CPU 201 transmits to the job transmission destination apparatus a notification for requesting the communication setting information of Wi-Fi communication. Then, the CPU 201 determines whether or not the communication setting information of Wi-Fi communication of the job transmission destination apparatus has been acquired therefrom (step S911).

If it is determined in the step S911 that the communication setting information of Wi-Fi communication of the job transmission destination apparatus has been acquired from the job transmission destination apparatus, the CPU 201 makes communication settings for Wi-Fi communication with the job transmission destination apparatus based on the acquired communication setting information (step S912). Then, the CPU 201 determines whether or not Wi-Fi communication connection to the job transmission destination apparatus has been established (step S913).

If it is determined in the step S913 that Wi-Fi communication connection to the job transmission destination apparatus has been established, the CPU 201 proceeds to the step S805 in FIG. 8.

If it is determined in the step S906 that there is no specified value-satisfying apparatus, the CPU 201 determines whether or not termination of the job transmission application is instructed by the user (step S914), and if termination of the job transmission application is not instructed, the CPU 201 returns to the step S904.

If it is determined in the step S909 that BLE communication connection to the job transmission destination apparatus has not been established, the CPU 201 determines whether or not termination of the job transmission application is instructed by the user (step S915), and if termination of the job transmission application is not instructed, the CPU 201 returns to the step S908.

If it is determined in the step S911 that the communication setting information of Wi-Fi communication of the job transmission destination apparatus has not been acquired from the job transmission destination apparatus, the CPU 201 determines whether or not termination of the job transmission application is instructed by the user (step S916), and if termination of the job transmission application is not instructed, the CPU 201 returns to the step S911.

If it is determined in the step S914, S915, or S916 that termination of the job transmission application is instructed by the user, the CPU 201 terminates the present process.

According to the above-described communication setting process in FIGS. 9A and 9B, the distances from the mobile terminal 101 to the job transmission destination candidate apparatuses are calculated, one of the job transmission destination candidate apparatuses is determined as the job transmission destination apparatus based on the calculated distances, whereafter the communication setting information of Wi-Fi communication is transmitted from the job transmission destination apparatus to the mobile terminal 101. As a consequence, even when neither the mobile terminal 101 nor the job transmission destination apparatus is equipped with the NFC function, communication settings for Wi-Fi communication between the mobile terminal 101 and the job transmission destination apparatus are made based on the communication setting information of Wi-Fi communication transmitted from the job transmission destination apparatus without a user himself/herself making communication settings for data communication, and hence it is possible to make communication settings for the mobile terminal 101 and the job transmission destination apparatus with ease.

Further, according to the above-described communication setting process in FIGS. 9A and 9B, a specified value indicative of a distance within which a user can operate the job transmission destination apparatus is set in advance, and out of the job transmission destination candidate apparatuses, a specified value-satisfying apparatus e.g. the MFP 102 is determined as the job transmission destination apparatus. Here, the MFP 102 is an apparatus which exists at a location from which the user having the mobile terminal 101 can operate the job transmission destination apparatus, and hence a case where the MFP 102 is a specified value-satisfying apparatus is nothing other than a case where the user is about to operate the MFP 102. Therefore, BLE communication connection is established between the mobile terminal 101 and the MFP 102 only when the user is about to operate the MFP 102, and hence it is possible to prevent data communication from being performed more than necessary between the mobile terminal 101 and the MFP 102.

Further, according to the above-described communication setting process in FIGS. 9A and 9B, in the case where the "approach-and-connect mode" is not set, out of the job transmission destination candidate apparatuses, an apparatus selected by a user is determined as the job transmission destination apparatus. This causes the communication setting information of Wi-Fi communication to be transmitted from the job transmission destination apparatus selected by the user to the mobile terminal 101 by BLE communication, and hence it is possible to cause the user's intension to be reflected. Therefore, it is possible to make communication settings for the mobile terminal 101 and the job transmission destination apparatus with ease without reducing user friendliness.

Although in the communication switching process in FIG. 8 and the communication setting process in FIGS. 9A and 9B, the description has been given of the case where the present invention is applied to execution of print processing, this is not limitative, but the present invention can be applied to processing executed based on a job transmitted from the mobile terminal 101, such as execution of scan processing. Also in a case where the present invention is applied to execution of scan processing, it is possible to obtain the same advantageous effects as provided by the above-described embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-029501 filed Feb. 18, 2015, which is hereby incorporated by reference herein in its entirety.

What is claimed is:

1. An information processing apparatus capable of disabling or enabling a Bluetooth function, comprising:
   Bluetooth circuitry that performs Bluetooth communication;
   wireless LAN circuitry that performs wireless LAN communication;
   a display configured to display information; and
   at least one controller configured to function as:
   a unit configured to perform a first connection function that receives user instructions for selecting a device from among a plurality of devices capable of communicating via Bluetooth communication, establishes a connection of the Bluetooth communication with the selected device, acquires network information of the selected device via the Bluetooth communication, and establishes a connection of the wireless LAN communication based on the acquired network information of the selected device, wherein the first connection function is performable provided that the Bluetooth function is enabled;
   a unit configured to perform a second connection function that acquires advertising information via the Bluetooth circuitry, establishes a connection of the Bluetooth communication with a transmission source device of the advertising information that satisfies a predetermined condition, acquires network information of the transmission source device via the Bluetooth communication, and establishes a connection of the wireless LAN communication with the transmission source device based on the acquired network information of the transmission source device, wherein the second connection function is performable provided that the Bluetooth function is enabled; and
   a unit configured to receive user instructions to enable the second connection function that establishes the connection of the Bluetooth communication with the transmission source device of the advertising information acquired via the Bluetooth circuitry and establishes the connection of the wireless LAN communication with the transmission source device based on the network information of the transmission source device acquired via the Bluetooth communication in a state where the Bluetooth function and the first connection function that receives the user instructions for selecting the device from among the plurality of devices capable of communicating via the Bluetooth communication and establishes the connection of the wireless LAN communication based on the network information of the selected device acquired via the Bluetooth communication are enabled and the second connection function that establishes the connection of the Bluetooth communication with the transmission source device of the advertising information acquired via the Bluetooth circuitry and establishes the connection of the wireless LAN communication with the transmission source device based on the network information of the transmission source device acquired via the Bluetooth communication is disabled, wherein the controller is further configured to function as a unit configured to: (i) cause the display to display a list of devices capable of communicating via the Bluetooth circuitry, (ii) determine whether the second connection function is enable or disabled, and (iii) cause, in response to it being determined that the second connection function is disabled, the display to display a button, together with the displayed list of devices capable of communicating via the Bluetooth circuitry, that receives the user instructions to enable the second connection function in the state where the Bluetooth function and the first connection function are enabled and the second connection function is disabled.

2. The information processing apparatus according to claim 1, wherein the controller is further configured to function as a unit configured to determine, based on radio field intensity of a radio wave including the advertising information, whether or not the predetermined condition is satisfied.

3. The information processing apparatus according to claim 2, wherein the controller is further configured to function as a unit configured to acquire, based on at least the radio field intensity of the radio wave, a distance information between the transmission source device and the information processing apparatus, wherein the predetermined condition is satisfied in a case where the acquired distance is shorter than a predetermined distance.

4. The information processing apparatus according to claim 1, wherein the advertising information is a Bluetooth Low Energy (BLE) advertising packet.

5. The information processing apparatus according to claim 4, wherein BLE advertising packet includes at least one of device information, address information, Tx power level information, and UUID information.

6. The information processing apparatus according to claim 1, wherein the controller is further configured to function as a unit configured to perform a communication of a print function via the established wireless LAN communication.

7. The information processing apparatus according to claim 1, wherein the controller is further configured to function as a unit configured to perform a communication of a scan function via the established wireless LAN communication.

8. A method of controlling an information processing apparatus including Bluetooth circuitry that performs Bluetooth communication, wireless LAN circuitry that performs wireless LAN communication, and a display configured to display information, the information processing apparatus being capable of disabling or enabling a Bluetooth function, the method comprising:

performing a first connection function that receives user instructions for selecting a device from among a plurality of devices capable of communicating via Bluetooth communication, establishes a connection of the Bluetooth communication with the selected device, acquires network information of the selected device via the Bluetooth communication, and establishes a connection of the wireless LAN communication based on the acquired network information of the selected device, wherein the first connection function is performable provided that the Bluetooth function is enabled;

performing a second connection function that acquires advertising information via the Bluetooth circuitry, establishes a connection of the Bluetooth communication with a transmission source device of the advertising information that satisfies a predetermined condition, acquires network information of the transmission source device via the Bluetooth communication, and establishes a connection of the wireless LAN communication with the transmission source device based on the acquired network information of the transmission source device, wherein the second connection function is performable provided that the Bluetooth function is enabled;

receiving user instructions to enable the second connection function that establishes the connection of the Bluetooth communication with the transmission source device of the advertising information acquired via the Bluetooth circuitry and establishes the connection of the wireless LAN communication with the transmission source device based on the network information of the transmission source device acquired via the Bluetooth communication in a state where the Bluetooth function and the first connection function that receives the user instructions for selecting the device from among the plurality of devices capable of communicating via the Bluetooth communication and establishes the connection of the wireless LAN communication based on the network information of the selected device acquired via the Bluetooth communication are enabled and the second connection function that establishes the connection of the Bluetooth communication with the transmission source device of the advertising information acquired via the Bluetooth circuitry and establishes the connection of the wireless LAN communication with the transmission source device based on the network information of the transmission source device acquired via the Bluetooth communication is disabled; and causing the display to display a list of devices capable of communicating via the Bluetooth circuitry, determining whether the second connection function is enable or disabled, and causing, in response to it being determined that the second connection function is disabled, the display to display a button, together with the displayed list of devices capable of communicating via the Bluetooth circuitry, that receives the user instructions to enable the second connection function in the state where the Bluetooth function and the first connection function are enabled and the second connection function is disabled.

9. A non-transitory computer-readable storage medium storing program instructions, which are executable by an information processing apparatus, which includes Bluetooth circuitry that performs Bluetooth communication, wireless LAN circuitry that performs wireless LAN communication, and a display configured to display information, the information processing apparatus being capable of disabling or enabling a Bluetooth function, the program instructions being executable by the information processing apparatus at least to:

perform a first connection function that receives user instructions for selecting a device from among a plurality of devices capable of communicating via Bluetooth communication, establishes a connection of the Bluetooth communication with the selected device, acquires network information of the selected device via the Bluetooth communication, and establishes a connection of the wireless LAN communication based on the acquired network information of the selected device, wherein the first connection function is performable provided that the Bluetooth function is enabled;

perform a second connection function that acquires advertising information via the Bluetooth circuitry, establishes a connection of the Bluetooth communication with a transmission source device of the advertising information that satisfies a predetermined condition, acquires network information of the transmission source device via the Bluetooth communication, and establishes a connection of the wireless LAN communication with the transmission source device based on the acquired network information of the transmission source device, wherein the second connection function is performable provided that the Bluetooth function is enabled;

receive user instructions to enable the second connection function that establishes the connection of the Bluetooth communication with the transmission source device of the advertising information acquired via the Bluetooth circuitry and establishes the connection of the wireless LAN communication with the transmission source device based on the network information of the transmission source device acquired via the Bluetooth communication in a state where the Bluetooth function and the first connection function that receives the user instructions for selecting the device from among the plurality of devices capable of communicating via the Bluetooth communication and establishes the connection of the wireless LAN communication based on the network information of the selected device acquired via the Bluetooth communication are enabled and the second connection function that establishes the connection of the Bluetooth communication with the transmission source device of the advertising information acquired via the Bluetooth circuitry and establishes the connection of the wireless LAN communication with the transmission source device based on the network information of the transmission source device acquired via the Bluetooth communication is disabled; and cause the display to display a list of devices capable of communicating via the Bluetooth circuitry, determine whether the second connection function is enable or disabled, and cause, in response to it being determined that the second connection function is disabled, the display to display a button, together with the displayed list of devices capable of communicating via the Bluetooth circuitry, that receives the user instructions to enable the second connection function in the state where the Bluetooth function and the first connection function are enabled and the second connection function is disabled.

10. The non-transitory computer-readable storage mediums according to claim 9, further storing program instructions executable by the information processing apparatus at least to:

determine, based on radio field intensity of a radio wave including the advertising information, whether or not the predetermined condition is satisfied.

11. The non-transitory computer-readable storage medium according to claim 10, further storing program instructions executable by the information processing apparatus at least to:

acquire, based on at least the radio field intensity of the radio wave, a distance information between the transmission source device and the information processing apparatus, wherein the predetermined condition is satisfied in a case where the acquired distance is shorter than a predetermined distance.

12. The non-transitory computer-readable storage medium according to claim 9, wherein the advertising information is a Bluetooth Low Energy (BLE) advertising packet.

13. The non-transitory computer-readable storage medium according to claim 12, wherein BLE advertising packet includes at least one of device information, address information, Tx power level information, and UUID information.

14. The non-transitory computer-readable storage medium according to claim 9, further storing program instructions executable by the information processing apparatus at least to:

perform a communication of a print function via the established wireless LAN communication.

15. The non-transitory computer-readable storage medium according to claim 9, further storing program instructions executable by the information processing apparatus at least to:

perform a communication of a scan function via the established wireless LAN communication.

* * * * *